United States Patent Office 2,813,895
Patented Nov. 19, 1957

2,813,895

PURIFICATION OF DEHYDROABIETYLAMINE

Richard B. Hasbrouck, Waukegan, Ill., assignor to Abbott Laboratories, North Chicago, Ill., a corporation of Illinois No Drawing. Application March 10, 1955,
Serial No. 493,549

10 Claims. (Cl. 260—501)

This invention relates generally to the preparation of relatively pure dehydroabietylamine and compounds containing a dehydroabietylamine group and more particularly to an improved method of treating a mixture of hydroabietylamines to obtain therefrom relatively pure dehydroabietylamine and compounds containing the said dehydroabietylamine group.

Dehydroabietylamine is a unique synthetic primary amine having a tricyclic ring structure which is obtained as part of a mixture of amines prepared by the hydrogenation of rosin acid nitriles and has the following formula:

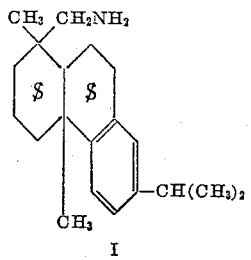

I

Dehydroabietylamine is available commercially under the trade name "Rosin Amine D" which consists of about 60 to 70 percent dehydroabietylamine and about 30 to 40 percent of a mixture of dihydro- and tetrahydroabietylamines and isomeric amines. Since dihydro- and tetrahydroabietylamines differ from dehydroabietylamine only by two and four hydrogen atoms respectively, many of the properties of these hydroabietylamines are very similar. The similarity of these hydroabietylamines makes their separation difficult and relatively expensive.

It has been found that dehydroabietylamine is a useful compound in the synthesis of certain pharmaceutical preparations. Thus, it can be employed as an intermediate for the preparation of N,N'-bis-(dehydroabietyl)-ethylenediamine which forms sparingly water-soluble reaction products with certain therapeutically useful compounds, such as penicillin G, as particularly described in pending patent application Serial No. 338,886, filed February 25, 1953, on behalf of the inventors A. W. Weston and A. F. De Rose, and wherein the compound N,N'-bis-dehydroabietylethylenediamine dipenicillin G is specifically disclosed. When the rosin amine mixture is used for the preparation of the foregoing intermediate, however, the dihydro- and tetrahydroabietylamine constituents form products which are more difficultly recoverable than those derived from substantially pure dehydroabietylamine. Therefore, for certain purposes the use of dehydroabietylamine in relatively pure form results in significantly increased yields of the desired therapeutic products. It would therefore be desirable to separate dehydroabietylamine from the other hydroabietylamine constituents of a commercial rosin amine mixture.

Therefore, it is an object of the present invention to provide an improved and more economical method of obtaining compounds containing the dehydroabietylamine group in a relatively pure form.

It is a further object of the present invention to provide an improved and more economical process of obtaining a lower fatty acid salt of the dehydroabietylamine in relatively pure form without having admixed therewith a substantial proportion of a compound having dihydro- and tetrahydroabietylamine groups therein.

It is still another object of the present invention to provide an improved and more economical method of obtaining dehydroabietylamine in relatively pure form without having admixed therewith substantial amounts of dihydro- and tetrahydroabietylamine.

It is also an object of this invention to provide an improved method of treating a hydroabietylamine mixture containing substantial amounts of dehydroabietylamine, dihydroabietylamine, and tetrahydroabietylamine in order to separate therefrom the dehydroabietylamine constituent in relatively pure form without having admixed therewith substantial amounts of the dihydro- and tetrahydroabietylamine constituents of the said mixture.

Other objects of the invention will be apparent from the detailed description and claims to follow.

It has been found that the lower fatty acid salts of dehydroabietylamine are appreciably less soluble in certain organic solvents than are the corresponding salts of dihydro- and tetrahydroabietylamines. These differences in solubility form the basis of a means of separating dehydroabietylamine from dihydro- and tetrahydroabietylamines. More specifically, it has been found that the addition of approximately one molar equivalent of a lower fatty acid to a solution of commercial rosin amine in one of a group of selected solvents causes a crystalline product to form which consists mainly of the salt of dehydroabietylamine and the said fatty acid. The corresponding salts of dihydro- and tetrahydroabietylamines largely remain in solution. The crystalline product can be separated by filtration or by other known means and consists mainly of the fatty acid salt of dehydroabietylamine, along with considerably smaller amounts of the salts of the other amines. The salt so obtained can be recrystallized from one or more of the suitable solvents to obtain a product which contains an even higher proportion of dehydroabietylamine than that in the crude salt.

The lower fatty acids which can be employed to form suitable salts for use in the above separation procedure are those having between one and eight carbon atoms per molecule and include such compounds as formic, acetic, propionic, butyric, and caproic acids. From the foregoing group of acids, acetic acid is the preferred one because of its availability and relatively low cost. Acetic acid also furnishes good yields of the desired salt in a relatively high state of purity.

The organic solvents which have been found most useful and suitable for separating and recrystallizing the fatty acid salts of the rosin amines are the substantially non-polar organic solvents, such as the petroleum hydrocarbon solvents including hexane and heptane, the latter two being the lower aliphatic petroleum hydrocarbon solvents available commercially as mixtures of isomers under the trade names Skellysolve B and Skellysolve C, respectively, and di-isopropylether.

In general, the procedure for separating dehydroabietylamine from the other components in a rosin amine mixture comprises dissolving a commercial rosin amine mixture, such as Rosin Amine D, in the solvent, the amount of solvent used depending upon the solubility of the desired product, but in general is in the range of approximately 5 to 15 cc. per gram of rosin amine mixture. To the solution thus obtained is added approximately one molar equivalent of the desired fatty acid, the latter being of substantially 100 percent purity. The fatty acid can be added in one portion to a warmed solution of the rosin amine, followed by cooling to obtain crystallization. An alternative method, particularly applicable when formic or acetic acid is used, comprises the addition of the fatty acid to the rosin amine solution at room temperature over a period of from one-half to one hour. When formic or acetic acid is added to the amine solution at room temperature, the desired acid addition salt crystallizes readily and continuously as the said acid is added. When one of the higher fatty acids, such as propionic through octanoic acid, is added to the amine solution at room temperature, however, the acid is advisedly added in one portion, since the latter acid addition salts crystallize relatively slowly from the amine solution. After crystallization is complete, the product is separated and washed with one or more portions of fresh, cold solvent and then dried. If desired, the product can be recrystallized from the same solvent or from another suitable solvent mentioned above. The dehydroabietylamine may be regenerated by dissolving the salt in warm water and treating with alkali, whereupon the free-base precipitates as an oil which is separated, washed with water, dried and distilled, or used directly, as desired.

In the following specific examples are shown several specific embodiments of the present invention but it should be understood that the invention is not to be limited to the specific reactions disclosed nor to the precise proportions or conditions set forth in the several specific examples, since the examples are given only for the purpose of illustrating the principle of the present invention.

*Example I*

Glacial acetic acid, 6.0 gm. (0.1 mole), is added in one portion to a stirred solution of 28.55 gm. (0.1 mole) Rosin Amine D in 360 cc. Skellysolve C at 70–75° C. The solution is allowed to cool with stirring, and at about 60° C. crystallization begins. The reaction is stirred and cooled to 20° C. over a period of about two hours. The product is then filtered, washed with 100 cc. cold Skellysolve C and dried in vacuum at 50° C. overnight. The crude dehydroabietylamine acetate is obtained as minute, colorless needles melting at 139.5–142.5° C. Ultraviolet spectral analysis shows the crude material to contain 82.8% of the theoretical amount of dehydrobietylamine, as compared with 60.5% in the original Rosin Amine D. The crude product is recrystallized from Skellysolve C and yields a product melting at 144–145° C. The recrystallized dehydrobietylamine acetate contains 87.8% of the theoretical amount of dehydroabietylamine by spectral analysis. On chemical analysis the product is found to contain 76.49% C, 10.32% H, and 4.02% N, as compared with theoretical values of 76.48% C, 10.21% H, and 4.05% N.

*Example II*

A solution of 6.0 gm. (0.1 mole) glacial acetic acid in 75 cc. Skellysolve B is added dropwise over a period of about one-half hour to a stirred solution of 28.55 gm. (0.1 mole) Rosin Amine D in 350 cc. Skellysolve B at 25° C. The product crystallizes continuously during the addition of the acetic acid. The reaction is allowed to stand for several hours to insure complete crystallization. The product is then filtered and washed with one 75 cc. and one 50 cc. portion of Skellysolve B and is then dried at 50° C. in vacuum overnight. The dehydroabietylamine acetate melts at 139.5–142° C. Ultraviolet spectral analysis shows the product to contain 86.3% of the theoretical amount of dehydroabietylamine, as compared with 60.5% in the original Rosin Amine D.

*Example III*

Glacial acetic acid, 3.0 gm. (0.05 mole), is added to a stirred solution of 14.27 gm. (0.05 mole) Rosin Amine D in 75 cc. benzene at 25° C. The reaction mixture is stirred at 15–20° C. for about one and one-half hours to complete crystallization. The product is filtered, washed with 20 cc. cold benzene and dried in vacuum at 50° C. overnight. The dehydroabietylamine acetate melts at 137–140° C. Ultraviolet spectral analysis shows the product to contain 80.8% of the theoretical amount of dehydroabietylamine, as compared with 60.5% in the original Rosin Amine D.

*Example IV*

Glacial acetic acid, 3.0 gm. (0.05 mole), is added to a stirred solution of 14.27 gm. (0.05 mole) Rosin Amine D in 125 cc. methyl cyclohexane at 90° C. The solution is stirred, cooled and seeded, and at about 65° C., crystallization begins. Stirring and cooling continues for about three hours, after which the product is filtered, washed with 25 cc. cold methyl cyclohexane and dried. The dehydroabietylamine acetate melts at 139–141.5° C. Ultraviolet spectral analysis shows the product to contain 83.8% of the theoretical amount of dehydroabietylamine, as compared with 60.5% in the original Rosin Amine D.

*Example V*

Glacial acetic acid, 3.0 gm. (0.05 mole), is added to a stirred solution of 14.27 gm. (0.05 mole) Rosin Amine D in 100 cc. di-isopropyl ether at 60° C. The reaction immediately becomes nearly solid with crystals. It is stirred and heated under reflux for about 15 minutes, and then is stirred and cooled to 25° C. The product is filtered, washed with 25 cc. di-isopropyl ether and dried in vacuum at 50° C. overnight. The dehydroabietylamine acetate melts at 138.5–140.5° C. Ultraviolet spectral analysis shows the product to contain 80.4% of the theoretical amount of dehydroabietylamine, as compared with 60.5% in the original Rosin Amine D.

*Example VI*

Glacial acetic acid, 3.0 gm. (0.05 mole), is added to a stirred solution of 14.27 gm. (0.05 mole) Rosin Amine D in 75 cc. chloroform at about 60° C. The reaction is stirred and cooled and crystallization begins at about 50° C. The reaction is cooled for about an hour to a final temperature of about 20° C. The product is filtered, washed with 25 cc. cold chloroform, and dried in vacuum at 50° C. overnight. The dehydroabietylamine acetate melts at 133–138° C. Ultraviolet spectral analysis shows the product to contain 73.5% of the theoretical amount of dehydroabietylamine, as compared with 60.5% in the original Rosin Amine D.

*Example VII*

Formic acid (98–100%), 2.3 gm. (0.05 mole), is added to a solution of 14.27 gm. (0.05 mole) Rosin Amine D in 180 cc. Skellysolve C at about 60° C. The clear solution is seeded with some previously prepared product and allowed to stand and crystallize overnight at room temperature. The solid is filtered, washed with two 50 cc. portions of Skellysolve C and dried. The product, dehydroabietylamine formate, melts at 141.5–142.5° C. Recrystallization of the crude material from Skellysolve C yields colorless needles melting at 147–148° C. On chemical analysis the product is found to contain 76.11% C, 10.14% H, and 4.15% N, as compared with theoretical values of 76.08% C, 10.04% H, and 4.23% N. Ultraviolet spectral analysis shows the recrystallized product to contain 83.9% of the theoretical amount of dehydroabietylamine, as compared with 60.5% in the original Rosin Amine D.

*Example VIII*

Propionic acid, 3.7 gm. (0.05 mole), is added to a solution of 14.27 gm. (0.05 mole) Rosin Amine D in 140 cc. Skellysolve C at 25° C. Crystallization is induced by scratching the walls of the flask. After about three hours, the solid is filtered, washed with 50 cc. Skellysolve C and dried. The product, dehydroabietylamine propionate, melts at 132–135° C. Recrystallization of the crude material from Skellysolve C yields minute, colorless needles melting at 137.5–139° C. On chemical analysis the product is found to contain 76.79% C, 10.30% H, and 4.00% N, as compared with theoretical values of 76.82% C, 10.38% H, and 3.90% N. Ultraviolet spectral analysis of the recrystallized product shows it to contain 88.4% of the theoretical amount of dehydroabietylamine, as compared with 60.5% in the original Rosin Amine D.

*Example IX* n-Butyric acid, 4.40 gm. (0.05 mole), is added to a solution of 14.27 gm. (0.05 mole) Rosin Amine D in 100 cc. Skellysolve C at 25° C. The solution is allowed to stand at 25° C. for about six hours to complete crystallization. The solid is filtered, washed with two 50 cc. portions of Skellysolve C and dried. The product, dehydroabietylamine n-butyrate, melts at 126–130° C. After recrystallization from Skellysolve C the product is obtained as minute, colorless needles melting at 132.5–134° C. On chemical analysis the product is found to contain 77.10% C, 10.37% H, and 3.88% N, as compared with theoretical values of 77.16% C, 10.52% H, and 3.75% N. Ultraviolet spectral analysis of the recrystallized product shows it to contain 89.6% of the theoretical amount of dehydroabietylamine, as compared with 60.5% in the original Rosin Amine D.

*Example X* n-Caproic acid, 5.81 gm. (0.05 mole), is added to a solution of 14.27 gm. (0.05 mole) Rosin Amine D in 75 cc. Skellysolve C at 25° C. Crystallization is induced by scratching the walls of the flask. The reaction mixture is allowed to stand at room temperature overnight. The solid is then filtered, washed with 40 cc. Skellysolve C and dried. The product, dehydroabietylamine n-caproate, melts at 107.5–109.5° C. Recrystallization of the crude material from Skellysolve C yields minute, colorless needles melting at 110–111° C. On chemical analysis the product is found to contain 77.70% C, 11.02% H, and 3.45% N, as compared with theoretical values of 77.75% C, 10.80% H, and 3.49% N. Ultraviolet spectral analysis shows the recrystallized product to contain 90.1% of the theoretical amount of dehydroabietylamine, as compared with 60.5% in the orignial Rosin Amine D.

While the Rosin Amine D used in the present examples has a dehydroabietylamine content of about 60.5% theoretical, a similar marked increase in the purity of the dehydroabietylamine is obtained when using Rosin Amine D in which the percentage of dehydroabietylamine varies between about 40% and 70%.

Others may readily adapt the invention for use under various conditions of service, by employing one or more of the novel features disclosed or equivalents thereof. As at present advised with respect to the apparent scope of my invention, I desire to claim the following subject matter.

I claim:

1. A method of preparing relatively pure dehydroabietylamine compounds which comprises contacting the lower fatty acid salts of a mixture of hydroabietylamines having a substantial proportion of dehydroabietylamine and a lesser proportion of dihydroabietylamine and tetrahydroabietylamine with a non-polar organic solvent in which the said dehydroabietylamine fatty acid salt is relatively insoluble, said solvent being present in an amount of at least about 5 cc. per gram of said mixture of hydroabietylamines, allowing the said dehydroabietylamine fatty acid salt to crystallize in said solvent, and separating the said crystalline fatty acid salt of dehydroabietylamine in a relatively pure form from the fatty acid salts of dihydroabietylamine and tetrahydroabietylamine in said solvent.

2. A method of preparing relatively pure dehydroabietylamine compounds which comprises contacting the lower fatty acid salts of a mixture of hydroabietylamines having a substantial proportion of dehydroabietylamine and a lesser proportion of dihydroabietylamine and tetrahydroabietylamine with a non-polar organic solvent, said solvent being present in an amount of at least about 5 cc. per gram of said mixture of hydroabietylamines, allowing the said dehydroabietylamine fatty acid salt to crystallize in said slovent, and separating the said crystalline fatty acid salt of dehydroabietylamine in a relatively pure form from the fatty acid salts of dihydroabietylamine and tetrahydroabietylamine in said solvent.

3. A method of preparing relatively pure dehydroabietylamine compounds which comprises contacting the lower fatty acid salts of a mixture of hydroabietylamines having a substantial proportion of dehydroabietylamine and a lesser proportion of dihydroabietylamine and tetrahydroabietylamine with a non-polar organic solvent, said solvent being present in an amount between about 5 to 15 cc. per gram of the said mixture of hydroabietylamines, allowing the said dehydroabietylamine fatty acid salt to crystallize in said solvent, and separating the said crystalline fatty acid salt of dehydroabietylamine in a relatively pure form from the fatty acid salts of dihydroabietylamine and tetrahydroabietylamine in said solvent.

4. A method of preparing a relatively pure dehydroabietylamine compound which comprises reacting a lower fatty acid with a hydroabietylamine mixture having a substantial proportion of dehydroabietylamine and a lesser proportion of dihydroabietylamine and tetrahydroabietylamine in a non-polar organic solvent in which the dehydroabietylamine lower fatty acid salt is relatively insoluble, said solvent being present in an amount of at least about 5 cc. per gram of said mixture of hydroabietylamines allowing the lower fatty acid salt of the dehydroabietylamine to crystallize in said organic solvent, and separating the said crystalline fatty acid salt of dehydroabietylamine in a relatively pure form from the fatty acid salts of dihydroabietylamine and tetrahydroabietylamine in said solvent.

5. A method of preparing a relatively pure dehydroabietylamine compound which comprises reacting a lower fatty acid with a hydroabietylamine mixture having a substantial proportion of dehydroabietylamine and a lesser proportion of dihydroabietylamine and tetrahydroabietylamine in a non-polar organic solvent, said solvent being present in an amount of at least about 5 cc. per gram of said mixture of hydroabietylamines, allowing the lower fatty acid salt of the dehydroabietylamine to crystallize in said non-polar organic solvent, and separating the said crystalline lower fatty acid salt of dehydroabietylamine in relatively pure form from the fatty acid salts of dihydroabietylamine and tetrahydroabietylamine in said solvent.

6. A method of preparing a relatively pure dehydroabietylamine compound which comprises reacting a lower fatty acid with a hydroabietylamine mixture having a substantial proportion of dehydroabietylamine and a lesser proportion of dihydroabietylamine and tetrahydroabietylamine in a non-polar organic solvent, said solvent being present in an amount between about 5 to 15 cc. per gram of hydroabietylamine mixture, allowing the lower fatty acid salt of the dehydroabietylamine to crystallize in said non-polar organic solvent, and separating the said crystalline lower fatty acid salt of dehydroabietylamine in relatively pure form from the fatty acid salts of dihydroabietylamine and tetrahydroabietylamine in said solvent.

7. A method of obtaining a relatively pure dehydroabietylamine compound which comprises reacting a lower fatty acid with a hydroabietylamine mixture having therein a major proportion of dehydroabietylamine and a minor proportion of dihydroabietylamine and tetrahydroabietylamine in a non-polar organic solvent heated to at least about 60° C., said solvent being present in an amount of at least about 5 cc. per gram of said mixture of hydroabietylamines, allowing the lower fatty acid salt of dehydroabietylamine to crystallize in the said solvent, and separating the crystalline dehydroabietylamine lower fatty acid salt in a relatively pure form from the said solvent.

8. A method of obtaining a relatively pure dehydroabietylamine compound which comprises reacting acetic acid with hydroabietylamine mixture having a major proportion of dehydroabietylamine and a minor proportion of dihydroabietylamine and tetrahydroabietylamine in a petroleum hydrocarbon solvent heated to at least about 60° C., said solvent being present in an amount of at least about 5 cc. per gram of said mixture of hydroabietylamines, allowing the acetic acid salt of dehydroabietylamine to crystallize in the said solution, and separating the crystalline dehydroabietylamine acetic acid salt in a relatively pure form from the said solvent.

9. A method of obtaining a relatively pure dehydroabietylamine compound which comprises reacting a lower fatty acid with a hydroabietylamine mixture having a major proportion of dehydroabietylamine and a minor proportion of dihydroabietylamine and tetrahydroabietylamine in a non-polar organic solvent at about room temperature, said solvent being present in an amount of at least about 5 cc. per gram of said mixture of hydroabietylamines, said lower fatty acid being added to the said hydroabietylamine mixture in small increments, allowing the lower fatty acid salt of dehydroabietylamine to crystallize in the said solvent, and separating the crystalline salt of dehydroabietylamine lower fatty acid salt from said solvent in a relatively pure form.

10. A method of obtaining a relatively pure dehydroabietylamine compound which comprises reacting acetic acid with a hydroabietylamine mixture having a major proportion of dehydroabietylamine and a minor proportion of dihydroabietylamine and tetrahydroabietylamine in a petroleum hydrocarbon solvent at about room temperature, said solvent being present in an amount of at least about 5 cc. per gram of said mixture of hydroabietylamines, said acetic acid being added to the said hydroabietylamine mixture in small increments, allowing the acetic acid salt of dehydroabietylamine to crystallize in the said solvent, and separating the crystalline dehydroabietylamine acetic acid salt from said solvent in relatively pure form.

References Cited in the file of this patent

UNITED STATES PATENTS

| | | |
|---|---|---|
| 2,520,901 | Benoit | Sept. 5, 1950 |
| 2,532,101 | Kalman | Nov. 28, 1950 |

FOREIGN PATENTS

| | | |
|---|---|---|
| 640,402 | Great Britain | July 19, 1950 |

OTHER REFERENCES

High Polymers, vol. IV; Myer-Interscience Publishers Inc., N. Y., N. Y., page 576 (1942).